March 29, 1955  O. L. CUNNINGHAM, JR  2,704,921
POWER DRIVEN GANG LAWN MOWER
Filed April 27, 1951  9 Sheets-Sheet 1

FIG. 1

INVENTOR.
OMAR L. CUNNINGHAM JR.
BY
Paul, Paul & Moore
ATTORNEYS

March 29, 1955  O. L. CUNNINGHAM, JR  2,704,921
POWER DRIVEN GANG LAWN MOWER
Filed April 27, 1951  9 Sheets-Sheet 4

INVENTOR.
OMAR L. CUNNINGHAM JR.
BY Pavel, Paul & Moore
ATTORNEYS

March 29, 1955    O. L. CUNNINGHAM, JR    2,704,921
POWER DRIVEN GANG LAWN MOWER
Filed April 27, 1951    9 Sheets-Sheet 8

INVENTOR.
OMAR L. CUNNINGHAM JR.
BY Paul, Paul & Moore
ATTORNEYS

United States Patent Office 2,704,921
Patented Mar. 29, 1955

2,704,921

POWER DRIVEN GANG LAWN MOWER

Omar L. Cunningham, Jr., Robbinsdale, Minn., assignor to Toro Manufacturing Corporation of Minnesota, Minneapolis, Minn., a corporation of Minnesota Application April 27, 1951, Serial No. 223,198

21 Claims. (Cl. 56—7)

This invention relates to grass-cutting machinery, more particularly to power-driven, rotary reel grass mowers. The classical rotary reel grass-cutting machine or mower utilizes a rotary reel suitably supported upon a frame so that it rotates in close proximity to a bed knife which is likewise carried upon the frame. In one usual form of such rotary reel grass-cutting machine, the frame is supported by ground wheels which are also utilized for producing the rotary power necessary for rotating the reel. Thus, in hand-powered lawn mowers the frame, having a handle to push it, has wheels at either side and the rolling motion of the wheels on the ground is communicated through suitable gearing and through ratchets to the rotary reel. In the customary construction each wheel is connected by gears and a ratchet to the adjacent end of the reel shaft, the ratchet being so arranged that the ground wheel which is traveling faster will rotate the reel, as during making a turn, and the slower running ground wheel meanwhile ratchets in respect to the rotary reel.

As the need for cutting larger grassy areas has arisen, such grass-cutting machines have been made of larger size and built with great precision and ruggedness, and were propelled first by horses and later by tractors, but the general mechanical pattern of drive from the ground wheels, through gearing and ratchets to the rotary reel has been preserved in many large capacity mowers because of its fundamentally sound design. Thus, in accordance with preceding designs, for cutting large grassy areas there has been provided a multi-power unit or tractor which serves to pull or push a plurality of rotary reel type grass-cutting units, all of which are supported independently on their own ground wheels and in which the ground wheels of each unit serve to rotate the rotary reel. In such a multiple unit system, the power of the tractor, which is usually a gasoline engine of the automotive type, is transmitted through clutch, gear box and differential to ground wheels of the tractor, which is steered by its own independent wheels in the customary manner of a tractor. The tractor serves merely as a towing vehicle for the plurality of grass-cutting units of the aforesaid type. In this form of gang mower there is no power transmitted directly from the gasoline engine of the tractor to the rotary reels of the grass-cutting units, the power being transmitted indirectly from the tractor to the earth's surface, thence up through the ground wheels of the cutting units and through the gear and ratchet arrangements thereof to the rotary reels.

This form of multiple unit grass-cutting machine, though widely used, is subject to the objection that the ground wheels of the cutting units serve no other purpose than their classical purpose of supporting the frame of the cutting unit and of providing rotary motion for rotating the cutting reel of the unit. At the same time the ground wheels of the tractor serve no other purpose than to provide a steered traction force.

It is an object of the present invention to provide an improved grass-cutting arrangement wherein the ground wheels of the mower cutting units serve also as the steering and propulsion wheels of the traction unit, and in such unit to provide an improved mechanical system of power transmission from a power source directly to the rotary reels.

It is another object of the invention to provide an improved multiple unit grass-cutting machine capable of being steered handily in close quarters and up and down sharp grades and wherein the ground wheels of such multiple units serve as steering and traction wheels while at the same time forming support for the cutting units.

It is another object of the invention to provide an improved multiple unit rotary reel grass-cutting machine of articulated type and providing power steering and with power transmission to the wheels and reels of such units.

It is a further object of the invention to provide an improved multiple unit grass-cutting machine having power transmission to the wheels of the grass-cutting units and power transmission directly also to the rotary reel of such units.

It is a further object of the invention to provide an improved articulated mowing machine composed of multiple rotary reel wheel supported grass-cutting units wherein power is supplied directly to all rotary reels of the units and wherein the wheels of the cutting units serve as sole support of the machine, power being supplied thereto for such tractive effort as is required merely to move the machine.

It is another object of the invention to provide a multiple unit mowing machine wherein the units are arranged in two ranks, one rank forward and one rank aft, there being a plurality of units in at least one rank, said units being connected by articulated framing whereby the unit or units of one rank can be steered with reference to the other rank.

It is another object of the invention to provide a mowing machine of the aforesaid character wherein each of the rotary reels of each unit is driven by a pair of differential output shafts, and the power to at least two units, where two are used, is supplied from output shafts of a differential, power being supplied to the reels and also to the wheels whereby the wheels are spared the necessity of driving the reels and at the same time loaded by the reel in case of wheel slippage, to the end that only enough tractive effort is required of the wheels of the unit for propelling the unit, said wheels meanwhile serving as the rolling support for the assemblage.

It is a further object of the invention to provide an improved power transmission system wherein rotative power is transmitted through a differential to two drive gears, each of which directly rotates a wheel of a grass-cutting unit and rotates the reel of the unit through a ratchet, the rotary reel being thus a mechanical load to differentially driven gear.

It is a further object of the invention to provide an improved multiple unit grass-cutting machine wherein power is transmitted from a differential and the output at each side of such differential is transmitted in each instance to the input of another differential and the two outputs therefrom to the wheels of a grass-cutting unit, said wheels being also connected through gears and ratcheting arrangement to a single rotary reel which accordingly loads the system.

It is another object of the invention to provide an improved multiple unit grass-cutting machine having an articulated frame, together with hydraulic means for moving said frame sections in articulated motion for steering.

It is a further object of the invention to provide improved multiple unit articulated grass-cutting machine wherein power is transmitted to at least some of the ground wheels of said multiple units and wherein the entire traction arrangement is supported upon such grass-cutting units.

Other and further objects of the invention are those inherent in the apparatus herein illustrated, described and claimed.

The invention is illustrated with reference to the drawings in which corresponding numerals refer to the same parts and in which:

Figure 5 is a schematic view illustrating the power transmission to two mowing units of a multiple unit mowing machine having two or more units. Figure 5 may also be considered as schematically illustrating the power transmission to the rear units of the five-unit embodiment of the invention illustrated in Figures 1, 2, 3, 12 and 13;

Figure 7 is a sectional view taken along the line and in the direction of arrows 7—7 of Figure 6;

Figure 8 is a fragmentary sectional view taken along the line 8—8 of Figure 3, illustrating the manner in which the mower units are attached to the traction frame. All mower units are similarly mounted. In Figure 8 only the wheel and axle of the mowing unit is shown, but it will be understood that the remaining elements of the mowing unit outlined in dotted lines in Figure 8, including the frame, cutting wheel and ground roller, are of course included;

Figure 10 is a fragmentary vertical sectional view through a modified form of ratchet arrangement, which may be utilized, if desired, and Figure 11, which corresponds to the modification shown in Figure 10, is a sectional view taken along the line and in the direction of arrows 11—11 of Figure 10;

Figures 12 and 13 are horizontal plan views drawn to a smaller scale of the mower frame and units and steering arrangement of the form of invention illustrated in Figures 1, 2 and 3, with the engine and various of the auxiliary structure removed. Figure 12 illustrates the frame articulation when the device is being steered to the right, and Figure 13 illustrates the articulation when the unit is being steered to the left;

Figure 1:
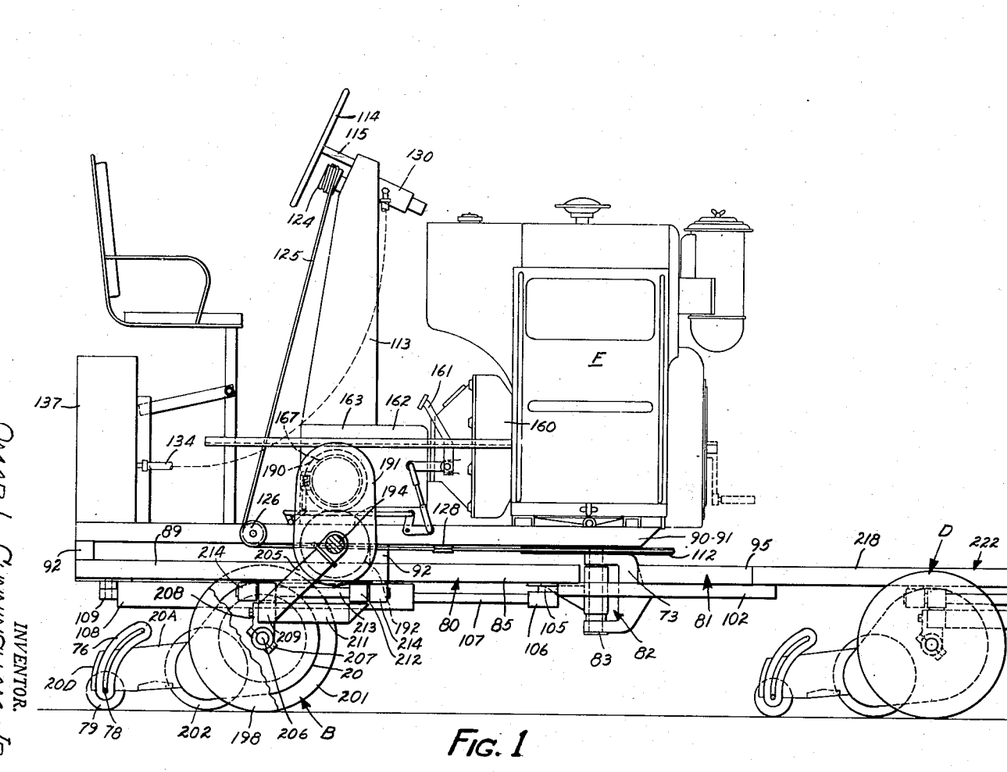
Figure 1 is a side elevational view of the right side of a multiple unit grass-cutting machine made in accordance with the present invention.
Figure 2:
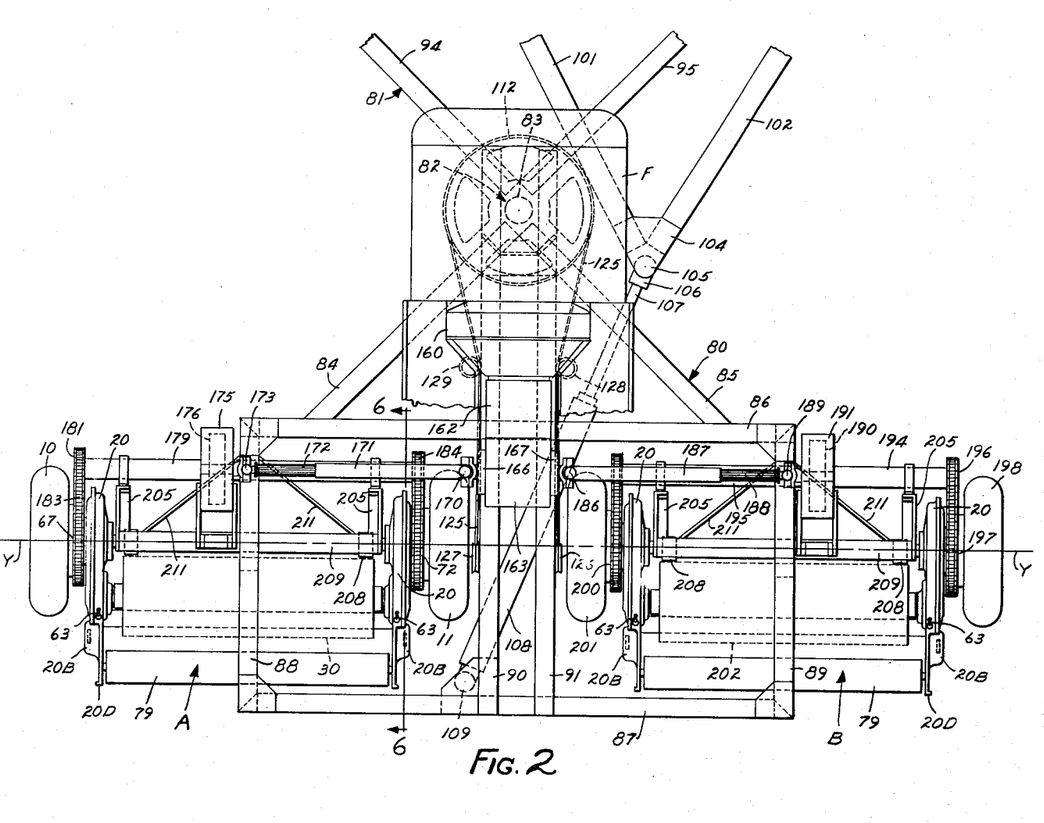
Figure 2 is a fragmentary plan view of the rear mower portion of the machine showing only the rear part of the engine and transmission and the articulated frame joint.
Figure 3:
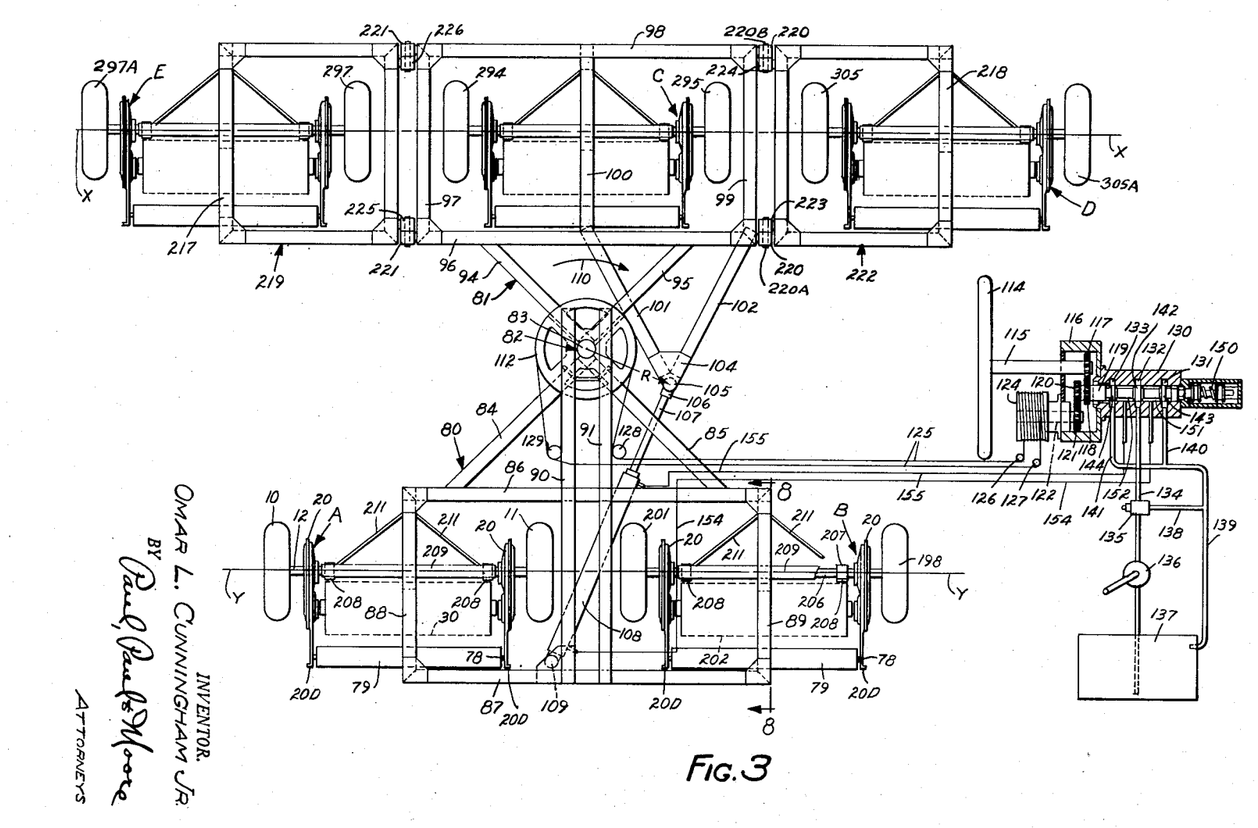
Figure 3 is a plan view drawn to a smaller scale of an exemplary five-unit form of mowing machine made in accordance with the present invention shown with the engine removed and with portions of the hydraulic steering arrangement separated and illustrated schematically.

Referring to the drawings, and particularly Figures 1, 2, 3, 6, 7, 12 and 13, there is illustrated one embodiment of the invention in which, for purposes of illustration, there are shown five mowing units. Referring to Figure 3, at the rear of the machine there are a pair of mowing units A and B and at the front of the machine a central mowing unit C, which has at its sides mowing units E at the left and D at the right. If desired, the units E and D may easily be eliminated, thus providing a three-unit machine. According to this invention the mower units are of the type having the reel driven by the ground wheels, and for convenience in servicing the units are preferably made identical, but they need not necessarily be identical. Any standard form of such units may be used and one form of strong and rugged design is illustrated at units A, B, C, D and E. These are shown as identical and therefore only one need be described.

Figure 6:
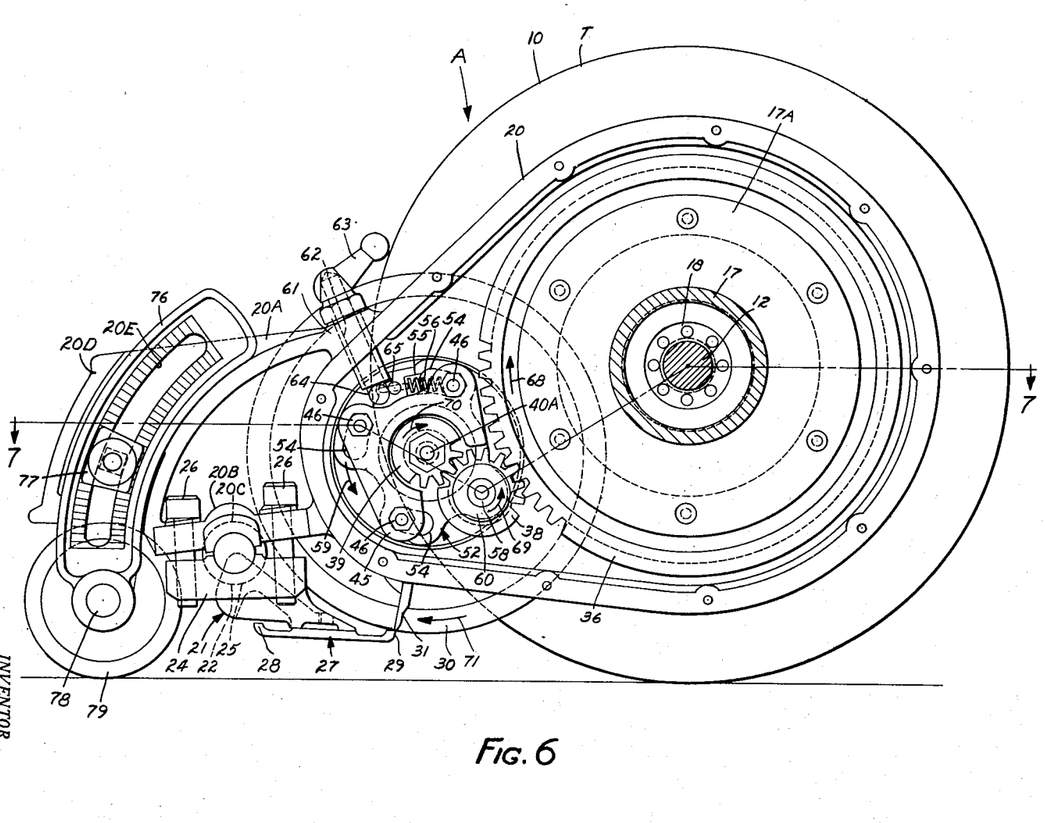
Figure 6 (which should be considered along with Figure 7) is an enlarged vertical sectional view taken along the line and in the direction of arrows 6—6 of Figure 2, and illustrates details of construction of one exemplary form of mower unit, showing particularly a ground wheel and the driving connection to it and to the rotary reel shaft of the grass-cutting units.
Figures 7, 10, 11:
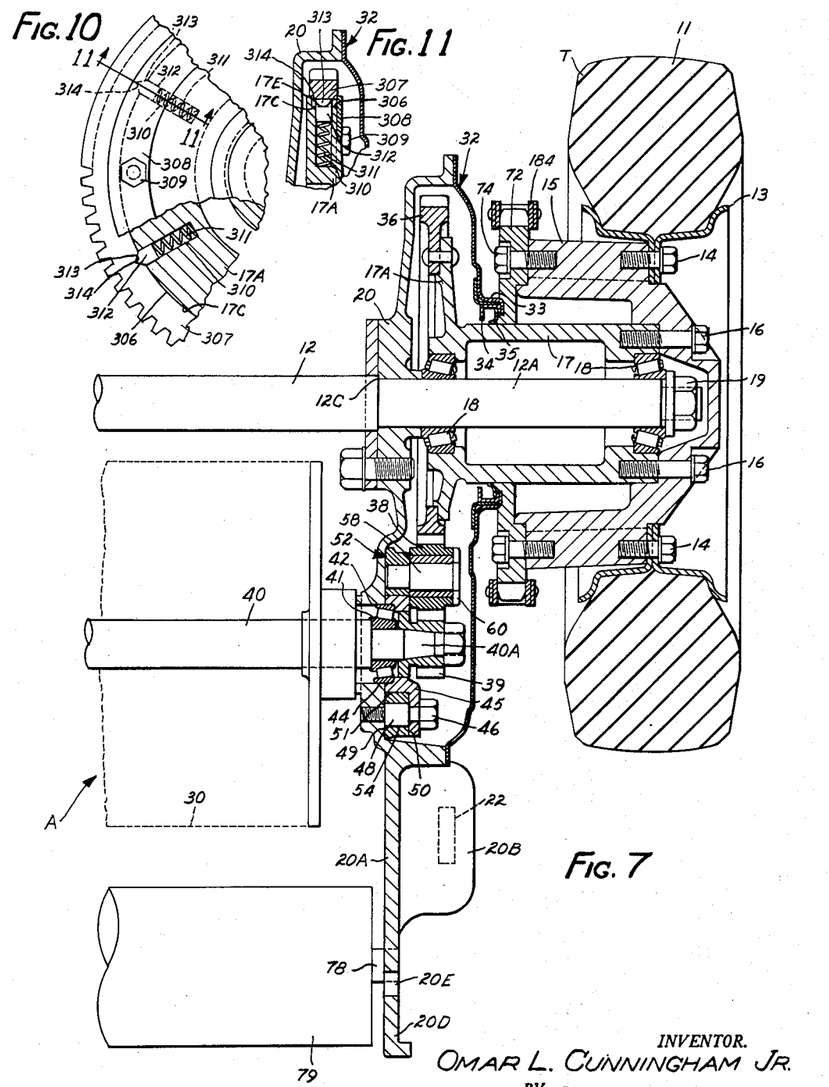

Each of the mowing units A through D has preferably a rubber tired pair of ground wheels such as 10 and 11, 198 and 201, 294 and 295, 297 and 297A, 305 and 305A, which rotate on a stationary axle such as axle 12 of unit A. The wheel and axle for each unit is mounted upon an individual mowing unit frame which also carries a reel and a cooperating bed knife as will be hereinafter described. The wheels are best illustrated in Figures 6 and 7. The illustration shows a solid or pneumatic tire T carried on the rim 13, the rim 13 being attached by means of studs 14, Figure 7, to an annular hub 15 which is in turn attached by means of studs 16 to an inner hub 17 that is rotatably mounted by means of the precision bearings 18 upon the reduced end 12A of the axle 12. The inner hub 17 and bearings 18—18 are retained in place by a nut 19 which is appropriately locked. Against the shoulder 12C of the axle there is positioned a frame member 20 having a portion extending rearwardly at 20A so as to form a seat 20B by means of which the knife bar, generally designated 21, may be firmly coupled. In this instance the portion 20B of the frame is provided with a semi-circular notch at 20C in which there is placed a circular disk "key" 22 which serves as a rotary base upon which the portion 24 of the bed knife (which is likewise provided with a circular notch 25) is adapted to rotate, the center of the disk 22 being the axis of rotation. Of course, the member 24 is drawn up tight by means of the adjusting screws 26—26 and the amount of rotation involved is what is necessary for adjusting the knife bar 21 and bed knife 27 carried thereon. The bed knife 27 has a pair of cutting edges 28 and 29, either of which may be used by merely reversing the bed knife which is attached to knife bar 21 by screws not shown. The cutting edge 29 of the bed knife is illustrated in Figure 6 as being in cutting relationship to the path of movement 30 of the rotary reel, one knife 31 of the reel being illustrated in Figure 6.

The mowing unit frame member 20, Figure 7, also serves as one half of a gear housing, the other half being a sheet metal stamping generally designated 32. The sheet metal stamping is provided with an annular embossment at 33 which serves to retain an oil seal at 34 that rides at 35 upon the smoothly machined exterior surface of the inner hub 17, thus preventing the entrance of dirt into the interior of the gear housing which is formed by the frame member 20 and the member 32. At the inner end of the inner hub 17 there is provided a circular flange 17A to which there is riveted a ring gear 36 which meshes with an idler gear 38, as shown in Figure 6, the idler in turn meshing with the pinions 39 upon the tapered end 40A of the rotary reel shaft 40. The rotary reel is shown at 30 in Figures 6 and 7.

The reel shaft 40 is carried by a precision tapered bearing 41 in a suitable bore 42 of the frame member 20. The outer race 44 of the bearing 41 is held in place by a retainer 45 that is attached by three cap screws 46—46—46. The cap screws are provided with annular collars at 48 which serve to establish a prescribed spacing between the inner surface 49 of the frame member 20 and the opposed under surface 50 of the bearing retainer 45. Also, the bearing retainer 45 has an annular surface 51 which is concentric with the bearing 41. In the space between the surfaces 49 and 50 of the frame member 20 and bearing retainer 45, respectively, and journalled on the annular surface 51 there is provided an oscillatable frame member generally designated 52 provided with slots 54 of slightly greater width than the diameter of the spacers 48. Accordingly, the member 52 will journal on the surface 51, within the limits of movement allowed by the slots 54. One of the slots 54 is provided with a notch at 55, in which a spring 56 is lodged, and since the spring bottoms on spacer 48 on adjacent screw 46, it causes the member 52 to be urged in the direction of arrow 59, as shown in Figure 6.

The member 52, which is free to oscillate within the limits of slots 54 and is normally pushed in the direction of arrow 59, is provided with a stub shaft at 58 upon which the idler gear 38 is journalled, said gear being held in place by a pressed on collar at 60. Referring to Figure 6, the mower frame member 20 is provided with a bearing boss at 61 in which there is journalled the shaft 62 that is provided with a handle 63. The shaft 62 is provided with a down-turned end at 64 which abuts against a pin 65 set in the oscillatable member 52. Accordingly, when the handle 63 is rotated one quarter turn, the entire oscillatable member 52 will be moved against action of spring 56 (opposite to the arrow 59, Figure 6)

and the idler gear 38 will be moved arcuately out of mesh with the teeth on the gear 36. When the handle 63 is moved to the position shown in Figure 6, however, the spring 56 moves the member 52 back to the position shown, determined by the collars on both studs 46—46 and then the idler 38 meshes precisely with the gear 36. In this position, when the gear 36 moves in the direction of arrow 68, Figure 6, this causes the idler 38 to rotate in the direction of the arrow 69, and it in turn causes the pinion 39 to rotate in the direction of arrow 70, thus causing the rotary reel to move likewise in the same direction, as illustrated by the arrow 71, adjacent one of the reel knives 31 in Figure 6. There is no reaction upon gear 38 to cause it to slip out of mesh. Accordingly, proper reel rotation is provided. However, in the event the rotary reel should be driven (by the other wheel) at a faster speed than would be provided by the rotation of the gear 36, the net effect is that a reaction force is exerted through idler gear 38 upon the stub shaft 58 and this force is transmitted to the member 52 which moves opposite to the direction of arrow 59 and against the action of spring 56 until a tooth of gear 38 moves out of engagement with a tooth of the gear 36. It will be understood, of course, that the spring 56 causes member 52 to snap back and bring the next tooth of gear 38 into engagement, thus causing the teeth of gear 38 to slip or "ratchet" over the teeth of the gear 36. This action does not cause any difficulty with the gear teeth themselves which are adequately hardened and run in grease.

This rugged type of mowing unit is preferably utilized in the instant invention, but it will be appreciated that other forms of mowing units or other forms of ratcheting drives may be used, if desired, the only requirement being that the rotary reel should be of the type in which one rotary reel is driven by two ground wheels each through a ratchet drive. As will be pointed out hereinafter, in accordance with this invention the power never has to be transmitted through the ground surface itself but the rotary reel is simply of the type which would be driven from the ground wheels if no separate system of drive was provided.

It will be noted that the outer hub 15, Figure 7, is provided with a chain sprocket gear at 72 which is held in place by the studs 74. The sprocket is driven by a chain 134, as hereinafter noted. It is also noted that the frame member 20 has a rearwardly extending portion 20D which is provided with an arcuate track at 20E in which the arcuately adjustable member 76 is adapted to be held at any vertically adjusted position by means of the clamping bolt 77. The member 76 (and a similar one on the opposite side of the frame) has a journal 78 for the ground roller 79, as illustrated in Figure 6. By adjusting the members 76 arcuately, the bed knife 27 may be raised or lowered for changing the height at which the grass is cut.

Referring now to Figures 1 through 3, 12 and 13, the frame of the exemplary five-unit form of mowing machine includes a rear portion generally designated 80 and a front portion generally designated 81 which are articulated together at the articulation joint 82, the joint 82 having a vertical pivot pin 83 about which the two sections 80 and 81 hinge relative to each other. The rear frame member 80 has two angularly disposed portions 84 and 85 which are attached to cross piece 86 of a generally rectangular frame, the piece 86 being parallel to the piece 87 to which it is connected by means of the longitudinal frame members 88 and 89. In addition, the rear frame member has central frame pieces 90 and 91 which serve to support the motor, transmission, steering column, operator seat and various auxiliaries. The members 90 and 91 are elevated in respect to the rectangular frame 86—89 by means of the spacer blocks 92—92 and the front ends of the members 90 and 91 are connected as shown in Figure 3 and are also steadied by the upper end of the pivot shaft 83 of the articulation joint.

Figure 12:
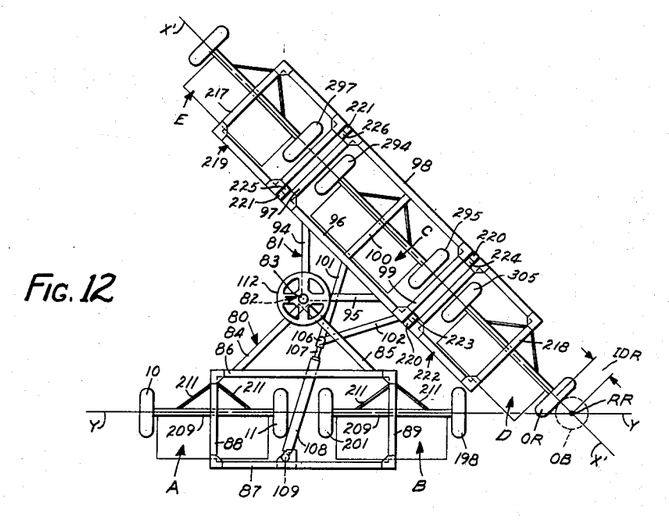
Figure 13:
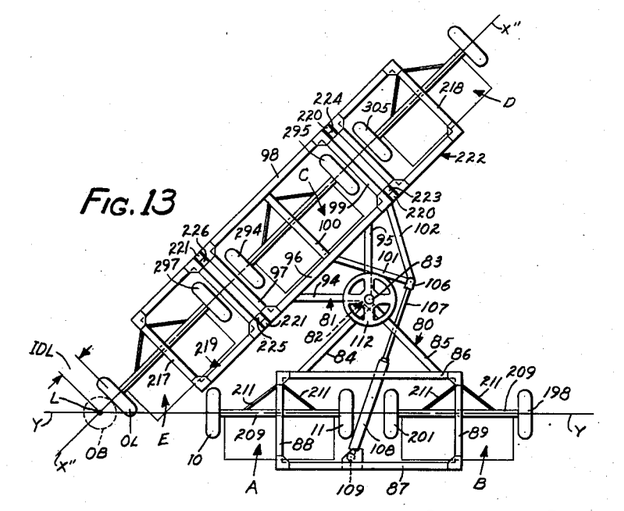

The front main frame member 81 has diagonal pieces 94 and 95 which likewise attach to a transverse frame member 96 of another rectangular frame consisting of the pieces 96, 97, 98 and 99. The rectangular frame 96—99 also has a central frame piece 100. Accordingly it will be observed that the two rectangular frame members 86—89 and 96—99 are held in the same plane by means of the articulation joint at 82 and that they are capable of swinging about the vertical hinge pin 83 of the articulation joint as shown in Figures 12 and 13.

From the frame member 81 there rearwardly extends an A-frame composed of the pieces 101 and 102 which are fastened solidly to members 96 and 99 and held together by the plate 104. This frame member lies immediately below the front frame member 81 but is stiffly attached thereto so that the pivot point 105 is held at a fixed radial distance R from the center of the hinge pin 83. The point 105 serves as a clevis to which the knuckle joint 106 of a hydraulic piston rod 107 is pivotally attached. The piston rod 107 works in the double acting hydraulic cylinder 108, the base of the cylinder being pivoted at 109 to the rear frame member 80. The hydraulic cylinder 108 is of the double acting type and when it moves so as to draw its piston 107 into the cylinder (pressure applied to line 155), the frame 81 is swung in the direction of the arrow 110 relative to the frame member 80, thus causing the frame to be articulated in a manner to steer the entire mechanism to the right. Likewise, when the hydraulic cylinder 108 is operated so as to project its piston rod 107 (pressure applied to line 154), the frame 81 will be moved in a direction opposite to arrow 110 and steering in a left direction will thereby be accomplished.

Concentric with the hinge pin 83 of the articulation joint (Figures 2 and 3), but fastened to the portion 73 (see Fig. 1) of the front frame member 81 (which forms part of joint 82) there is attached a pulley wheel 112 which accordingly forms a part of and is fixed in respect to the front frame member 81. Extending upwardly at about the mid-portion of the frame members 90—91 there is a steering column support 113 on which a steering wheel 114 is mounted.

Please refer to Figure 3. The steering wheel 114 is on a shaft 115 that is journalled in the housing 116 (the housing being fixedly mounted on the standard 113, Figure 1). Inside the housing, which forms a gear case and valve case, there is a gear 117 which has bevel cut teeth mating with gear 118 on the hydraulic control shaft 119. Also upon the shaft 119 is another gear 120 likewise having bevel cut teeth mating with a corresponding gear 121 carried on shaft 122, journalled in housing 116.

The pitch diameter of all the gears 117, 118, 120 and 121 are all the same. The gear 121 is carried on the shaft 122 which is journalled in the housing 116 and extends outwardly therefrom, being provided at its outer end with a drum 124 over which there runs a steel cable 125 which is trained over pulleys 126 and 127 and over pulleys 128 and 129, and thence traverses the diameter of the wheel 112 and is fastened to wheel 112 at one point. The bevel cut on the gears 117—118 and upon the gears 120—121 is arranged so that when the cable 125 holds the drum 124 steady, and hence holds gear 121 steady, if under those circumstances the steering wheel 114 is turned, this will cause the shaft 119 to move axially a little bit in one direction or the other in respect to the housing 116, depending upon the direction wheel 114 is turned. This axial motion of shaft 119 causes actuation of a plug valve which is mounted upon the shaft 119, and this in turn hydraulically actuates steering.

The casing 116 has a valve casing portion extending at 130 which is provided with annular ports 131, 132 and 133. The port 132 is connected to a pressure supply pipe at 134 which extends through an over-pressure valve 135 and thence to the pressure supply pump 136 that is constantly driven so long as the motive power of the unit runs. The pump 136 draws oil from the tank 137 and establishes the pressure against the valve 135. The valve 135 is set so that at a given pressure it by-passes the oil through the by-pass line 138 to the return line 139. The return line 139 has branches 140 and 141 connected to the annular chambers 131 and 133, respectively. The shaft 119 has a reduced portion provided with accurately ground embossments 142, 143 and 144 which fit in the bore of casing portion 130. Thus, there is provided an accurately ground plug at 142 which has a length such that it can just bridge the width of annular port 132 when shaft 119 is in the neutral or central position and a pair of plugs 143 and 144. The plugs 143 and 144 are situated so that they will just close the channels 131 and 133, respectively, when the shaft 119 is centered.

The outer end of the shaft 119 is provided with a balanced spring arrangement at 150 by means of which the shaft 119 of the valve is always brought to a definite central position where plug 142 just bridges channel 132 and plugs 143 and 144 just close channels 131 and 133, respectively, but the shaft 119 may be moved from said central position against the balancing springs. From the space 151 in the valve a line extends at 154 to the bottom of the hydraulic cylinder 108, and from the space 152 a line extends at 155 to the top of the hydraulic cylinder.

In the central position the plug 142 closes off the flow of pressure from the pressure supply line 134 to the annular spaces 151 and 152, and in such central position the plugs 143 and 144 are each on their seats just sufficiently so as to hold any flow of oil through the valving system. When this occurs the oil from either side of the piston in cylinder 108 is held from flowing through lines 154 and 155, since space 151 of the valve is blocked by plugs 142 and 143 and space 152 is blocked by plugs 142 and 144. Therefore, the piston 107 remains as it was last set and the machine steers accordingly. When pressure is introduced into the line 155 and is relieved from the line 154 the piston 107 will be retracted into the cylinder 108 and the device will steer to the right. When pressure is applied to the line 154 and is relieved from line 155, the piston 107 will be projected outwardly and the device will steer to the left. Accordingly, when the steel cable 125 holds the drum 124 immovable with reference to the housing 116, and the steering wheel 114 is turned, the bevel on the gears 117, 118, 120 and 121 will cause movement of the gears 120 and 118 in an axial direction and will accordingly move the shaft 119 on which the gears are fixed also in an axial direction. Since the shaft 119 carries plugs 142, 143 and 144, the valve is also actuated.

Assuming a movement of the steering wheel 114 to the right (as for steering to the right, as shown in Figure 12) this causes the stem 119 to move to the right and the plug portion 142 unseats from the left shoulder of the annular chamber 132 and at the same time the plug 144 slides a little more into the bore and holds closed the path from space 152 to the annular channel 133, while at the same time the plug 143 rides clear of the shoulder on the annular channel 131, thus opening a path from space 151 to channel 131. Accordingly, oil under pressure from line 134 travels from the annular channel 132 through the space 152 to line 155, and accordingly the hydraulic cylinder 108 causes the piston 107 to be retracted, thereby moving the frame piece 81 in a direction as shown in Figure 12 for right steering. The oil pushed out of the cylinder 108 through the line 154 is returned to the space 151 and thence past the plug valve 143 to the annular channel 131 and hence returned to the system via line 140. As the front frame member 81 moves for right steering it likewise moves the ring 112 and this causes a relative motion of the cable 125, thereby turning the drum 124 and the gear 121. If the handle wheel 114 has been held steadily, the effect of such rotation of drum 124 is to cause the gears 120 and 118 to move the shaft-valve stem 119 to the left, or contrary to the direction in which they had been initially moved by the right steering movement of the wheel 114 and the valve is accordingly brought back to neutral position. However, the members 80 and 81 will then be held in an angularly disposed relationship and right steering will continue until the wheel 114 is again brought back to center. If a greater angularity between the members 80 and 81 is desired, the wheel 114 is simply turned further to the right and then after the members 80 and 81 have moved to a correspondingly increased angular position the valve will again be closed. Accordingly the system is what is known as a servo mechanism and for each position of the wheel 114 there is a corresponding angular position of the frame members 80 and 81.

The leftward movement of the steering wheel 114 (for causing left steering as shown in Figure 13) causes a corresponding leftward movement of the shaft-valve stem 119 and valve plugs 142, 143 and 144 are all moved to the left, and pressure is then communicated to line 154 and is relieved from the line 155, to cause left steering. As soon as the members 80 and 81 have moved a distance corresponding to the amount of left steering movement of the wheel 114, the follow-up system of cable movement will again center the valve and no further increase of angularity (for steering) will occur.

Figures 12 and 13 represent limiting positions for right and left steering but it will be understood that a lesser amount of angular steering movement as obtained by appropriately turning the steering wheel a lesser amount right or left. In either case, the wheel is turned and the articulated frame is moved angularly, right or left, depending upon the direction the wheel 114 is turned. Then the hydraulic mechanism follows until the follow-up mechanism described (112, 125, 124, 121 and 120) causes the valve again to be centered, and the machine will then continue steering, right or left, at a turning radius which is inversely proportional to the amount of turning of the wheel 114. The more wheel 114 is turned, the shorter will be the steering radius.

As shown in Figure 3, the front mower or mowers (C or C, D and E) are arranged side by side along a transverse rank line X—X, whereas rear mowers A and B are arranged side by side along a rear rank line Y—Y. The angularity between lines X—X (of front frame member 81) and Y—Y (or rear frame member 80) is determined by the steering movement of frame 81 relative to frame 80. According to this invention, at maximum steering angularity, as shown in Figures 12 and 13, the frames 81 and 80 are positioned relatively so that the intersection RR of rank lines X'—X' and Y—Y (for right steering, as in Figure 12) and the intersection L of rank lines X"—X" and Y—Y (for left steering as in Figure 13) are the centers of the steering circles of the machine and are from 6 inches inside to 12 inches outside the center of the tread of outermost mower wheel OR (Figure 12) or OL (Figure 13). In these figures the intersection distances IDR (Figure 12) and IDL (Figure 13) are illustrated as outside the wheel center by an amount equal to about 6 inches to 8 inches. Since all steering takes place in a steering circle about points RR or L (as centers of minimum radius of steering, right or left), it follows that the entire machine, while seemingly large, may be steered closely about an object OB (Figures 12–13) such as a tree, curb, bunker, etc., thus minimizing trimming. In actual practice it has been found possible to steer so closely around shrubs, trees, curbs, bunkers and the like that need for trimming is reduced and frequently entirely eliminated. The machine is exceedingly agile.

The system of mechanical drive is best illustrated in Figures 1 through 5. In the illustrated embodiment of the invention arrangement is made to transmit power to the ground wheels 10 and 11 of mower A and the ground wheels 198 and 201 of the mower B. All of the front mowers C, D and E are merely pushed and the ground wheels of such mowers serve as steering wheels for the entire machine and also perform their usual function of rotating the rotary reels of the mowers C, D and E.

Figure 5:
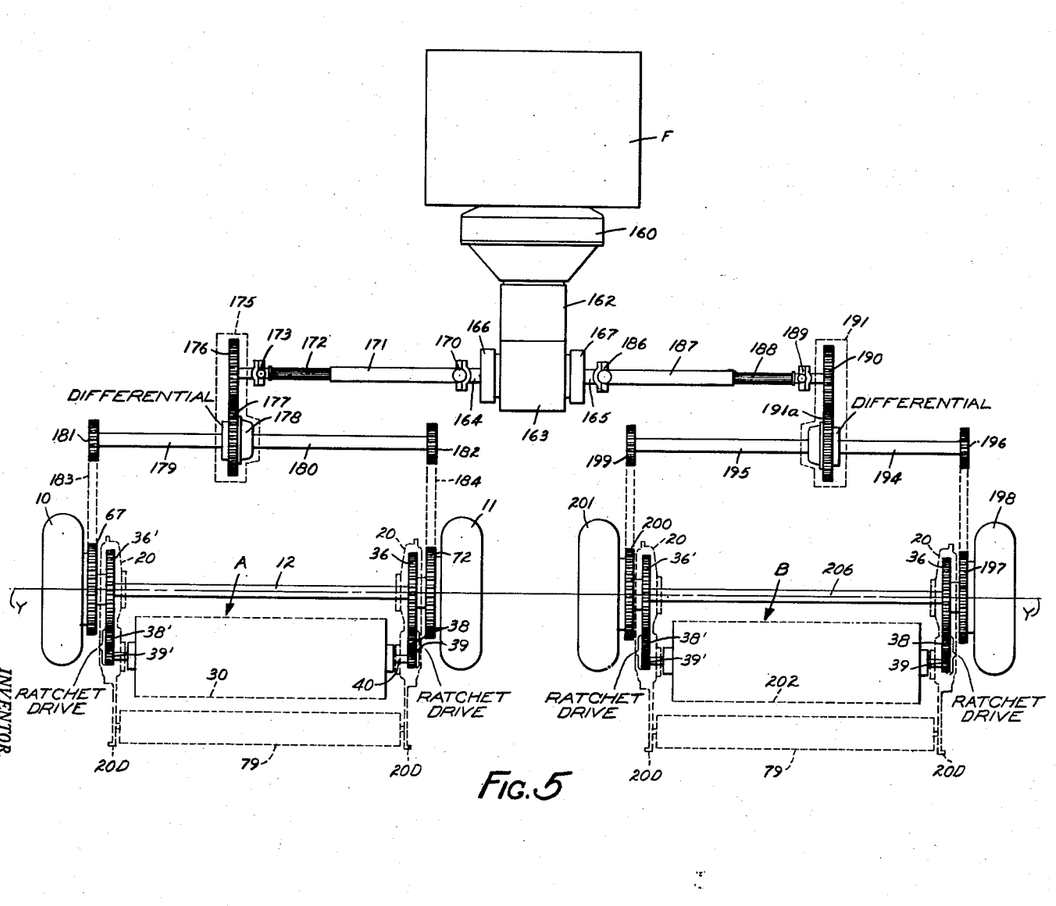

In respect to the mowers A and B, power is transmitted from an engine F, shown in Figure 1, through the clutch 160 which is arranged to be disengaged by the foot pedal 161 which is connected to a gear box 162 which in turn is directly connected to a differential 163. Referring particularly to Figure 5 wherein the system of power transmission is shown schematically, the differential 163 thus has power delivered to it in the same manner as an automotive differential and from either side of the differential there projects main differential power output shafts 164 and 165 corresponding to the automotive axle shafts. Shafts 164 and 165 are differentially driven and each of shafts 164 and 165 is provided with a brake drum as at 166 and 167. The rotary motion of shaft 164 is then transmitted to the mowers A and the rotary motion of shaft 165 is transmitted to mower B. Hence, load of mower A is in differential relation to the load of mower B. Thus, from the shaft 164 power is transmitted through the universal joint 170, the mowing unit power input shaft 171 (which is provided with a splined joint at 172), thence through a second universal joint 173 and to a mower unit differential housing 175, which is provided with an internal gear 176 which drives the differential ring gear 177 of the differential 178. From the mower unit differential 178 power is transmitted again to the two differentially driven mowing unit power output shafts 179 and 180 which in this instance terminate in chain sprockets 181 and 182 which are connected by the chains 183 and 184 to the drive sprockets 67 and 72 on the wheels of the mower A. Thus, on the wheel 10 of mower A there is provided a sprocket 67, while on the wheel 11 there is provided a sprocket 72 which has previously been referred to with reference to Figure 7, in the detailed description of the mower unit. As previously described the sprocket 72 is connected so as to drive the rotary reel 30 through the gear train 36, 38 and 39. A corresponding gear train connects the sprocket 67 to the opposite end of the rotary reel 30. In each instance a ratcheting action is provided in this gear train, either through the gears themselves, as described, or conventional ratchet, so that in the event the rotary reel 30 overruns the speed at which either one of the gear trains would drive it, a ratcheting effect will ensue. Accordingly, the sprocket 72 is connected through ratchet and gear drive 36—38—39 to one end of the reel shaft and the sprocket 67 is connected through a corresponding ratchet gear set 36', 38' and 39' to the other end of the reel shaft.

Referring again to the main differential 163, the main differential power output shaft 165 is likewise connected through a universal 186 and mowing unit power input shaft 187 (with the spline 188 in it) and through a universal 189 to the gear 190 and the unit B differential housing 191. The gear 190 drives the differential ring gear 192 which in turn differentially drives mower unit power output shafts 194 and 195. The shaft 194 is similarly provided with a sprocket at 196 which through a chain drives the sprocket 197 of the wheel 198 on the mower B, whereas the shaft 195 has a sprocket 199 which, through a chain drives the sprocket 200 on the wheel 201 of the mower B. The ratchet-gear train connection between the sprocket 197 and the rotary reel 202 of the mower B is precisely the same as that described at 36, 38 and 39 with reference to mower A, and a corresponding gear train and ratcheting arrangement is provided between the sprocket 200 and the rotary reel 202.

The net effect of this mechanical arrangement is that when the power is transmitted from the power unit F to clutch 160 and gear box 162 and thence through main differential 163, the torque on shaft 164 is balanced against the torque of shaft 165. The torque in each one of these shafts 171—187 is transmitted through a mower unit differential as through differential 178 for mower A and 191A for mower B and thence through chain and sprocket drives, viz. 181, 183 and 67 to wheel 10 and one end of the reel shaft of unit A, and through sprocket 182, chain 184 and sprocket 72 to wheel 11, and the other end of the same reel shaft of unit A. Accordingly, the sprockets 67 and 72 of wheels 10 and 11 which are, respectively, connected to such sprockets, are each differentially driven with respect to the power supply from the shaft 164 and either sprocket and its wheel is free to overrun the other if slippage of the wheel should allow. However, each of the sprockets 67 and 72 is connected by the ratchet-gear trains 36, 38 and 39 and accordingly the sprocket 67 or 72 which travels the fastest must also assume the whole load of accelerating rotation of the rotary reel 30. The net effect of this is that if one of the wheels 10 or 11 begins to slip due to a lack of traction, it will tend to speed up and in speeding up it is loaded by the extra torque load required for accelerating the rotation of the rotary reel 30. Therefore, the rotary reel serves as a standby potential load which is immediately applied to either sprocket 67 and wheel 10 or sprocket 72 and wheel 11 which tends to accelerate.

In the same way the reel 202 serves as a load which must immediately be assumed when either of the wheels 198 or 201 tends to slip. If it is assumed that one of the four wheels 10, 11, 198 or 201 begins to slip in the system illustrated in Figure 5 (which can also represent Figures 1–3), such wheel through its companion sprocket must accelerate and drive its rotary reel. The effect is, therefore, that the reels 30 and 202 markedly decrease the skidding which otherwise tends to occur in differential drive systems. The torque load thus imposed by each cutting reel 30 or 202 is not only the torque needed to accelerate the reel (when a wheel slips) but also frictional torque load due to the engagement of reel and bed knife, this latter load being roughly proportional to the speed of the reel. If one assumes an extreme case, as though one of the wheels 10, 11, 198 or 201 struck ice or was entirely free of the ground, such free wheel would therefore have to run four times as fast as the average speed of wheels 10, 11, 198 and 201 in order to absorb the available rotation of the driving system, and in thus tending to accelerate to said four times normal speed, the freed wheel would have imposed on its driving system the full torque required for accelerating and driving the reel (30 or 202) of its mower unit. This load thus imposed upon the driving system of the freed wheel would cause a corresponding torque increase to be imposed through differentials 178, 191 and 163 upon the remaining wheels still having traction, with the result that the machine as a whole has remarkably improved traction.

An added factor is that the only tractive force required for wheels 10, 11, 198 and 201 is that they should be able to propel the unit, being in this respect different from those installations wherein the wheels-ground traction produces the torque needed for rotating the reels. In this invention the reels are supplied with power directly and the only torque normally delivered to the wheels is that needed for moving the machine and pushing unpowered units. Relative to Figure 14, hereinafter referred to, even units C, D and E and units G and H are, where used, supplied with power for rotating the reels thereof and for driving the ground wheels of unit C and ground wheels of units D, E, G and H.

Figure 8:
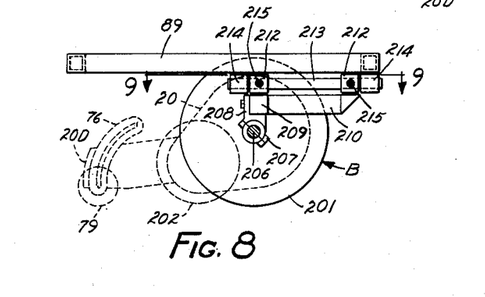
Figure 9:
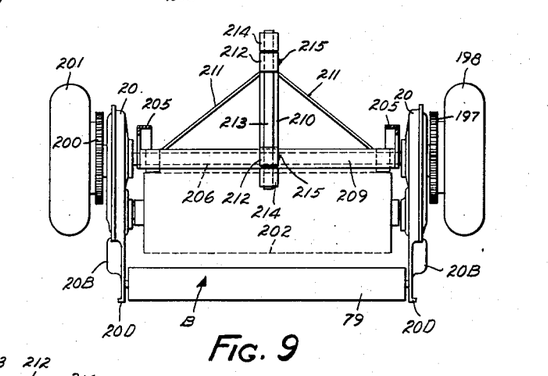
Figure 9 is a fragmentary plan sectional view taken along the line and in the direction of arrows 9—9 of Figure 8.

Referring to Figure 1 the differential housing 191 (and the corresponding housing 175 on the opposite side of the machine) is in each instance carried by strut 205 extending up from the frame of the mower. As shown in Figures 8 and 9, all of the mowing units in the system are similarly attached to the main frame. In these figures the rotary reel and frame members carrying the reel have been deleted for clarity and only the axles and rubber-tired wheels are illustrated. Thus, the wheels 198 and 201 are carried on the axle 206, as previously described with reference to Figures 6 and 7. The axle is a stationary axle and to it are clamped a pair of fasteners 207 which have an upwardly extending portion 208 serving as a perch for frame member of square section 209. The frame member 209 has a forwardly extending tongue at 210 which is side braced by the diagonal members 211—211. Upon the central tongue 210 are mounted a pair of bearings 212—212 which serve rotatably to receive the mounting pin 213 which extends into the frame blocks 214—214 that are attached to the under side of the frame member beneath which the particular mower is mounted. As shown in Figure 8 for mower B the pivot blocks 214—214 are welded to the under side of the member 89. For attaching mower A the members 214—214 are welded to the under side of frame piece 88. This manner of attachment of the mowers permits them to oscillate in a plane transverse to the direction of movement of the main frame of the machine, the oscillation being about the axis of the mounting pin 213 which is, of course, held in place by set screws, cotter pins and the like. Lubrication is provided by means of the grease fittings 215. Therefore, as the main machine frame member 80 moves in a forwardly direction the two mowers A and B are always kept side by side through the axles of the two mowers and the two mowers themselves are perfectly free to oscillate about their mounting pins 213 within clearance limits.

Correspondingly, with reference to mower C, which is mounted on frame member 81, the mounting blocks 214—214 (Figure 8) are fastened to the under side of frame piece 100 and the mower C is accordingly free to oscillate in a vertical plane which extends through the axle of the mowing unit C.

The frame member 81 has a pair of bearing blocks on its right side, as shown at 220—220, and another pair of bearing blocks at 221—221 on the left side of the machine for mounting wing frames 222 and 219, respectively. At the right side of frame member 81 there is provided a rectangular wing frame generally designated 222 which is likewise provided with bearing blocks at 223 and 224. Pivot pins 220A and 220B extend through the blocks 220—223 and 220—224, thereby permitting the frame piece 222 to swing up and down in a vertical plane. Under the right-hand frame member 218 of the frame 222 there is pivotally connected the mower D, which is mounted in precisely the manner as previously described for mowers A, B and C. The mower E is mounted upon the wing frame 219 which is provided with bearing blocks 225 and 226 that are pivoted to the blocks 221—221 of the frame 81. The mower E is likewise pivoted under the frame member 217 in precisely the same manner as previously described. Accordingly, across the front of the machine the three mowers E, C and D are held in perfect side-by-side alignment but are free to move in a vertical plane to follow ground contours. This freedom of movement is enhanced because the mower C forms in effect a one-point support for the frame 81 since the mower itself may roll forward and backward about its wheels and the mower C is connected as shown in Figure 8 to the pivots under the bar 100. Accordingly, the stability of the entire machine frame 80—81 is determined by the positions of the bars 88 and 89 of the frame member 80 and the bar 100 on the frame member 81 which are in turn supported by the three mowers A, B and C, respectively. In this way no undue strain is placed upon the articulation joint. In this manner a very flexible machine is provided. At the same time power being provided to the four wheels of the two rear mowers A and B in the manner described, enables the machine to be propelled up remarkably steep slopes without slippage of the wheels.

Figure 4:
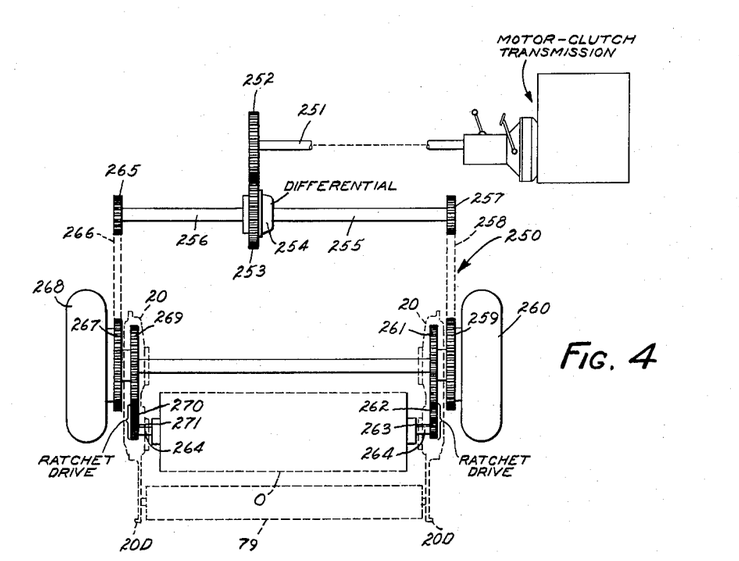
Figure 4 is a detailed schematic view of a single unit mowing machine of the present invention which may be considered either as a 1-unit machine or as one unit of a multiple unit machine, illustrating the manner in which the power is transmitted from the power input (such as a motor-clutch-transmission) thence by way of differential to differentially driven output shafts and from such shafts to each wheel of the unit and also (through ratchets) to each end of the rotary reel shaft of the machine.

The fundamental drive to the mower wheels is illustrated in Figure 4 which also schematically represents a single unit machine. Thus, in Figure 4 there is shown a single mowing unit generally designated 250 to which power is supplied by any suitable motor to the mowing unit power input shaft 251 which is also the main differential output shaft and which drives the differential which through gears 252 and 253 drives the differential 254 which in turn differentially drives the mowing unit power output shafts 255 and 256, the shaft 255 being connected by the sprocket 257, chain 258 to sprocket 259 which directly drives the right ground wheel 260 and gear 261 which through the ratchet-gear arrangement 262 and 263 drives the right end of shaft 264 of the rotary reel O. Similarly, the shaft 256 through the sprocket 265, chain 266 and sprocket 267, which directly drives the left wheel 268 and the gear 269, which in turn, through the ratchet-gear arrangement 270—271 drives the left end of shaft 264 of rotary reel O. The system is provided with an inherent ratchet arrangement by way of the gears shown, as illustrated in Figure 6, so that the reel O is driven by that one of the gears 261 or 269 which revolves the most rapidly. In this fundamental system the reel O loads the gear 261 or 269 which tends to turn the fastest, such gears being firmly fastened to the wheels 260 and 268, respectively, are prevented from turning fast in the event the ground traction decreases sufficiently so as to permit the wheel to slip on the earth's surface. This system of the instant invention has great utility, not only in single unit machines but also in three-unit machines or larger multiple machines. Thus, in Figure 3 the units E and D may be dispensed with by simply removing the frames 222 and 219 to provide a 3-unit machine or left on to provide a five or seven unit machine.

In Figure 4 there is illustrated a single drive unit and in Figures 2 and 5 two drive units. Steering such units can be by a simple guide handle attached to the single unit of Figure 4, or by means of a sulky or guiding wheel pivotally articulated thereto as in Patent 2,299,859, the steering force being provided by the operator. However, in larger machines having three, five or seven units the steering is accomplished according to the present invention.

Figures 14, 15:
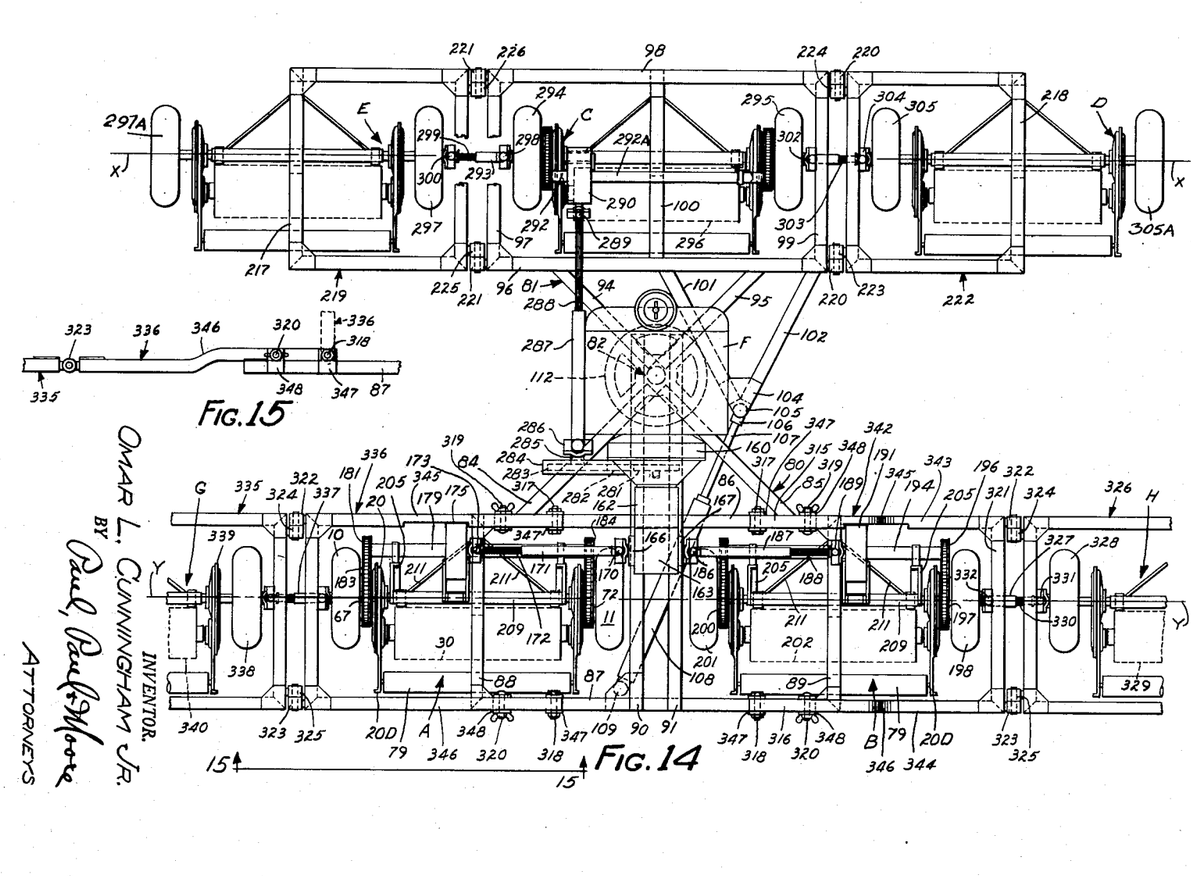
Figure 14 is a plan view illustrating a multiple unit articulated frame grass-cutting machine of the present invention with provision for transmission of power, not only to the rear units but also to the front units thereof. This figure also illustrates the manner in which a five-unit machine may easily be converted into a seven-unit machine, the extra two units being movable to a raised position for transporting, or removable.
Figure 15 is a fragmentary side elevational view of a portion of the frame of the machine shown in Figure 14, this view being taken along the line and in the direction of arrows 15—15 of Figure 14.

Referring now to Figure 14 the system is similar to that shown in Figures 1–3, previously described, except that provision is made for supplying power to the forward mowing units C, D and E and two additional mower units G and H are optionally added to the rear rank Y—Y. Thus, from the gear box 162 drive gearing is provided at 281, 282 and 283 in a housing 284 which constitutes a side housing on the transmission-clutch housing. From the housing 284 a drive shaft 285 extends forwardly to the universal joint 286 and to the main differential power input shaft 287 which is splined at 288 so as to be longitudinally extensible, and thence to the universal joint 289 to a differential housing 290 which in this case is of automotive type, being driven through a pinion, not shown, and ring gear, not shown, of the bevel type, rather than as previously described at 191 in Figure 1. From the differential 290 there extend two differentially driven main differential power output shafts 292 and 292A. From these shafts the drive to wheels 294 and 295 and to the rotary reel 296 is in precisely the same manner as for the mowing units A and B and as shown and described with reference to Figure 4. In addition, from the wheel 294 a mechanical rotary drive connection is made through the shafting arrangement at 293, to the wheel 297 of the mowing unit E. The shafting arrangement 293 includes a universal joint 298 and a spline at 299 so as to permit extension or contraction of the shaft 293 and a second universal joint 300. In this manner when wheel 294 of unit C is rotated, wheel 297 of unit E is also rotated. Similarly, from wheel 295 of unit C a shafting connection including universal joint 302, splined shaft 303, and universal joint 304 is made to the wheel 305 of the mowing unit D. By this system rotary propulsive force is transferred from the engine F to the rear mowing units A and B and the front mowing unit C and to one wheel each of the mowing units E and D.

In Figure 14 two additional rear rank wing mowing units G and H are illustrated. These mowing units are arranged side by side along the rear rank transverse line Y—Y and they are used where a cutting swath which is even wider than that provided by mowing units A through E is desired. The mowing units G and H are similarly mounted and are arranged so that they may be dismounted entirely or pivoted upwardly relative to the frame member 80 so that the overall width of the machine may be reduced for going through gates and into storage buildings and the like.

The rear rank wing framing for supporting the mowing units G and H is identical and hence only one need be described. Thus, for the mowing unit H there is provided a rear rank wing frame member generally designated 342 which is generally U-shaped. The frame 342 has side members 343 and 344 which are shaped at 345 and 346 so that the portions 315 and 316 are positioned on top of frame pieces 86 and 87 of the main frame member 80, and end 321 is at the same height as part 89 of frame 80. The parts 315 and 316 are pivotally connected to these frame members 86 and 87, respectively, by means of side plates 347 welded to frame members 86 and 87 which extend upward to receive bolts 317 and 318. These bolts are aligned, and hence form pivots by means of which the entire frame 342 may be swung upwardly where desired, or the bolts 317 and 318 may be removed entirely where the entire frame member 342 is thereby disconnected. In order to hold the frame member 342 fixedly with respect to the frame 80 there are provided additional bolts 319 and 320 having wing nuts or other easily removable nuts thereon. As also shown, bolts 319 and 320 are connected in the same manner as bolts 317 and 318, having plates 348 extending upward from frame members 86 and 87. When these bolts 319 and 320 are in place they lock the extension frames 342 rigidly with respect to the member 80. At the outer end 321 of the member 342 there are provided pivots 322 and 323 which are similar in every respect to the pivots 220 and 221 on the front frame member 81. These pivots serve as mountings which receive the pivot members 324 and 325 of the outer frame generally designated 326, of which only a portion is shown. This outer frame is identical with the frame 222 and serves as a support for the mowing unit H just as the frame 222 supports the mowing unit D.

A power connection at 327 is likewise provided so that the rotation of wheel 198 serves to rotate the wheel 328 of mower unit H and the rotation of this wheel 328 is communicated through its gearing directly to the reel 329 of the mowing unit H. Consequently, the reel 329 of the mowing unit H is power driven as is also one of the wheels 328 of such mowing unit in a manner exactly similar to the drive to mowing unit D. The power connection coupling 327 has a spline joint at 330 and a pair of universal joints 331 and 332 so that movement of the mowing unit H relative to the mowing unit B does not effect much of the power from the wheel 198 to the wheel 328. The spline joint 330 is made so that as the frame 326 is swung up to a vertical position and the mower H likewise so moved, the spline 330 separates, accordingly breaking the connection between the wheel 198 and 328 during transporting. The spline is re-aligned and re-connected as the frame 326 is lowered. After the mower unit H has been thus swung up onto the frame 342, the frame 342 may then be swung up so as to bring the entire assemblage to an inboard position where it is supported by brackets not illustrated for transporting movement through narrow gates, etc. Similar folding may be provided for the mowers D and E of the front rank along the line X—X.

The supporting frame generally designated 335 for the mower unit G at the left in the rear rank Y—Y is mounted upon the frame generally designated 336 in a manner exactly similar to the mounting described for the frames 326 and 342, respectively, and a separable, splined and universally jointed power connection 337 is likewise provided so that power is transmitted from the wheel 10 to the wheel 338 of the mower unit G, regardless of position of said mowers in traveling over the turf, and hence power is supplied through the gearing 339 of mowing unit G to the reel 340, which is accordingly power driven as is also the wheel 338. In this manner the entire assemblage of mowers is all provided with power for driving the rotary reels of the mowers and for rotating the ground wheels of all of the mowers except the outermost wheels of the outer units. Accordingly, in this entire machine the ground wheel traction need only be sufficient to propel the machine, since all rotary reels are directly powered.

Referring to Figures 10 and 11 there is illustrated an alternative form of ratcheting arrangement which is capable of ratcheting in either direction. In this form of the invention the portion 17A of the inner hub is thickened and is provided with a journal surface 17C on which the inner surface 306 of the ring gear 307 is adapted to rotate. The journal surface is provided with a flange 17E at one side and a plate 308 is attached thereto at the opposite side by means of cap screws 309 so as to prevent the ring gear 307 from sliding off. At several places around the periphery of portion 17C of the inner hub there are provided radial holes at 310—310 in which are positioned springs 311—311. Upon the tops of the springs are short pins 312—312 provided with conical or rounded ends 313—313. On the inner bearing surface 306 of the ring gear 307 there are provided corresponding depressions 314—314, into which the pins 312 are adapted to snap. Accordingly, the ring gear 307 is held from turning with reference to the portion 17C of the inner hub flange, except when the torque exceeds a predetermined amount, whereupon the reaction force will cause the pins 312 to be forced inwardly against the action of springs 311 and will permit the ring gear to turn on the flange 17C of the inner hub. So long as the torque is sufficient, such turning will continue, but when the torque decreases below a prescribed amount, the action will be discontinued and a drive connection thereupon maintained between the flange 17C of the inner hub and the gear train to the rotary reel. When this form of ratcheting arrangement is used, a straight gear train is provided without a ratchet between the ring gear 307 and the pinion 39 on the end of the rotary reel shaft 40 from each wheel. Accordingly, when one of the wheels of a mower so equipped runs faster than the other wheel, the ratcheting pin 312—312 on one or both sides will be pressed inwardly and the ring gears 307 on one side will be permitted to turn sufficiently so as to make up the difference in the rate of rotation of the wheels.

As many apparently widely different embodiments of this invention may be made without departing from the spirit and scope thereof, it is to be understood that I do not limit myself to the specific embodiments herein.

What I claim is:

1. A self-propelled mowing machine comprising a frame having thereon a pair of ground wheels, a power source and a differential, said differential having a power input shaft, means for connecting the power source to the power input shaft of the differential, a pair of differentially driven shafts extending from said differential and driven thereby in differential relation, power drive connections one each of which extends between each of said shafts and one of said wheels, respectively, for driving said wheels, a rotary reel rotatively mounted on the frame and positioned between said wheels and a bed knife mounted on the frame between said wheels for cooperation with said reel, and power drive connection means between each of said differentially driven shafts and said rotary reel, said power drive connection means including means arranged so as to transmit power only from the differentially driven shafts to the reel but not from the reel to said shafts.

2. A mowing machine comprising a frame, a motor mounted on said frame, a support for said frame including at least one pair of wheels forming the wheel support for said frame, a differential mounted on said frame, a drive connection between said motor and said differential for driving said differential, a pair of shafts connected to said differential and driven in differential relation thereby, a drive gear on each of said wheels, the drive gear on one of said wheels being connected in driven relation to one of said differentially driven shafts, and the drive gear of the other of said wheels being connected in driven relation with the other of said differentially driven shafts, a rotary reel rotatably mounted on said mowing machine frame, a bed knife mounted on said frame and cooperating with said reel, and overrunning drive connection connecting each of said drive gears with said reel and driving the same, said overrunning drive connections being oriented so as to allow the reel to overrun the drive gear, and means for steering said frame.

3. A multiple unit mowing machine comprising a main frame, a steerable wheel mounted on said frame for steering movement relative to said frame, at least two mowing units mounted on said frame and each having wheels forming a wheel support for said main frame, means for moving said steerable wheel relative to the mowing units for steering said main frame, said mowing units each including a unit frame having a pair of wheels, an axle carried by each of said unit frames upon which said wheels are mounted and a rotary reel and bed knife mounted on each of said mowing unit frames in cooperating relation with each other, a motor mounted on said main frame, a main differential having a power input shaft mounted on said main frame, and a drive connection between said input shaft and said motor, a pair of main differential output shafts driven in differential relation from said main differential, a pair of unit differentials, one mounted on each of said mowing units, each of said unit differentials having an input shaft, the input shaft of each of said unit differentials being connected, respectively, to one of said main differential output shafts, each of said unit differentials including a pair of unit differential output shafts driven in differential relationship, said shafts being connected, respectively, to the wheels of the mowing unit on which said unit differential is mounted, and drive connection between each of said unit differential output shafts and the reel of the unit on which said differential is mounted, said drive connection including a one-way drive connection oriented so as to transmit power from said unit differential output shaft to the reel of the unit but not to transmit power from said reel to said unit differential output shaft.

4. A multiple unit mowing machine having a machine frame composed of a front frame member, a rear frame member, a hinge joint connecting said front and rear frame members for hinging movement relative to each other about a substantially upright hinge axis, steering means for moving said front and rear frame members relatively for steering movement about a steering circle, a pair of wing frames pivotally connected to opposite sides of the front frame member, said wing frames being pivoted to said front frame member along axes which are substantially parallel, front rank mowing units located under and pivotally attached to the front frame member and to each of said wing frames extending at the sides thereof, said front rank mowing units each being attached along pivot axes which are evenly spaced and parallel to each other, and thereby held evenly spaced in side-by-side relation for free movement in a vertical plane transverse to the said axes, a pair of rear rank mowers located side-by-side under said rear frame member and pivotally attached thereto along spaced parallel axes located approximately midway between the spaced parallel axes of attachment of said front rank mowers, said rear rank mowing units being thereby held side-by-side for swinging movement relative the rear frame member and in spaced relation for cutting swaths intermediate the swaths cut by said front rank mowing units, each front and rear rank mowing unit including a unit frame, ground wheels, rotary reel and bed knife mounted thereon, said mowing unit ground wheels forming the sole rolling support for said machine frame, said ground wheels of the front rank mowers as a group and rear rank mowers as a group being, respectively, held in spaced relation along separate radii of the steering circle of the mowing machine when the machine is steered, motor means on the frame and power transmission means for applying power to at least some of said mowing unit ground wheels for propelling the same.

5. The mowing machine of claim 4 further characterized in that means is provided for transmitting power to only the reels and ground wheels of the rear rank mowing units.

6. The mowing machine of claim 4 further characterized in that means is provided for transmitting power to the ground wheels and reels of the rear rank mower units and to the central mowing unit of the front rank of mowing units.

7. The apparatus of claim 6 further characterized in that means is provided for transmitting power to the reels and to all of said unit ground wheels except the outer wheels of the outermost mowing units of the front rank of mowing units.

8. The apparatus of claim 4 further characterized in that rear rank wing frames are provided and pivotally attached to each side of the rear frame member, a mowing unit pivotally attached to each of said rear rank wing frames and thereby held in spaced relation and aligned with the rear rank mowing units attached to the rear frame member, each such mowing unit being pivotally movable in an erect transverse plane through the rear rank mowing units pivotally attached to the rear frame member.

9. The apparatus of claim 8 further characterized in that power transmission means is provided for transmitting power from the motor means to the reels and ground wheels of the rear rank mower units pivotally attached to the rear frame member and to the reels and at least one wheel of each of the rear rank mower units attached to the rear rank wing frames.

10. A multiple-unit mowing machine comprising a frame having a front and rear portion, a mowing unit pivotally connected to said frame for oscillation about a horizontal axis over said unit and extending substantially longitudinally of the frame under the front portion of said frame, said unit being movable relative to the rear portion of the frame for steering said frame, a pair of mowing units mounted under the rear portion of said frame, each of said units being mounted for oscillation about a horizontal axis over said units and extending substantially longitudinally of the frame, each of said units including ground-drive wheels and a rotary reel and cooperating bed knife, differential drive means connected to the ground-drive wheels for supplying power in differential relation to the ground-drive wheels of at least two of said units, said differential drive means including power transmission means connecting the ground-drive wheels of each unit and the rotary reel of such unit, said drive connections including one-way drive means whereby the power can be transmitted from each wheel to the reel but not from the reel to said wheels.

11. A multiple-unit mowing machine comprising a frame, including a front portion and a rear portion connected together by an articulating joint having a substantially vertical hinge axis, a front central mowing unit having a pair of ground wheels, a frame, a rotary reel and a bed knife, drive connections between the wheels and the rotary reels of said unit, including ratchet means oriented to permit the reel of said unit to overrun either of the wheels of said unit, said unit being connected to the front portion of said frame for swinging movement about a substantially horizontal axis extending substantially longitudinally of said front portion of said frame, a pair of mower units connected to the rear portion of said frame for oscillation about spaced substantially parallel axes longitudinally of the rear portion of the frame, said units forming a wheel support thereof, each of said mowing units including a pair of wheels, a mower frame, and a rotary reel and bed knife mounted thereon, each of said wheels being drive-connected to the rotary reel for driving the reel, said drive connections from each wheel including a ratchet so as to permit the reel to overrun the wheel, a motor on the mower frame, a main differential on the mower frame, including a pair of differentially driven shafts, drive connection between the motor and the differential, a pair of unit differentials each having a power input shaft connected to one of said differentially driven shafts of the main differential, said unit differentials being mounted one on each of the mower units that are attached to the rear portion of the frame, each of said unit differentials including a pair of mower drive shafts which are differentially driven, a drive connection between said shafts, respectively, and the pair of wheels of said mowing unit, and means for moving the front portion of the frame relative the rear portion of the frame for steering the unit.

12. The mower unit of claim 11 further characterized in that a pair of front wing frames are pivotally attached to the front portion of the main frame, said front wing frames extending from either side of said front portion and connected thereto along substantially horizontal axes extending parallel to the direction of movement of the front portion of said main frame and a mowing unit connected to each of said front wing frames for oscillation about a substantially horizontal axis extending substantially parallel to the direction of movement of said front wing frames.

13. The mower unit of claim 12 further characterized in that a pair of rear wing frames are pivotally attached to the rear portion of the main frame, said rear wing frames extending at either side of the rear portion and pivotally joined thereto along substantially horizontal axes extending parallel to the direction of movement of said rear portion of the main frame, and a mowing unit connected to each of said rear wing frames for oscillation about a substantially horizontal axis extending substantially parallel to the direction of movement of said rear wing frames, said mowing units and the mowing units pivotally attached to the rear portion of the main frame being mounted for swinging movement in substantially the same plane.

14. The apparatus of claim 11 further characterized in that the mowing unit supporting the front portion of the main frame has a differential mounted thereon and said power unit mounted on the main frame is connected thereto for driving said differential, said differential of the front unit including unit drive shafts differentially driven therefrom, said drive shafts being connected respectively to the wheels of said front mowing unit to drive said wheels, each of said wheels being drivingly connected through a ratchet to the reel of said mowing unit for driving the reel from the wheel.

15. The apparatus of claim 11 further characterized in that the mowing unit supporting the front portion of the main frame has a differential mounted thereon and said power unit mounted on the main frame is connected thereto for driving said differential, said differential of the front unit including unit drive shafts differentially driven therefrom, said drive shafts being connected respectively to the wheels of said front mowing unit to drive said wheels, each of said wheels being drivingly connected through a ratchet to the reel of said mowing unit for driving the reel from the wheel and further characterized in that a pair of front wing frames are pivotally attached to the front portion of the main frame, said front wing frames extending from either side of said front portion and connected thereto along substantially horizontal axes extending parallel to each other and to the direction of movement of the front portion of said main frame and a mowing unit connected to each of said front wing frames for oscillation about a substantially horizontal axis extending substantially parallel to the direction of movement of said front wing frames, each of the mowing units on the front wing frames being provided with a pair of wheels, and drive connections between a wheel of each of said mowing units attached to the front wing frames and an adjacent wheel of the mowing unit attached to and supporting the front portion of the main frame.

16. The apparatus of claim 15 further characterized in that rear wing frames each having a mowing unit attached thereto are pivotally mounted at each side of the rear frame member.

17. A traction frame mowing unit subcombination comprising a frame member having a power unit thereon, a pair of mower units for supporting said frame member, each of said units including an axle, a pair of wheels and a unit frame having a rotary reel and bed knife mounted thereon, and a main differential mounted on the mower unit frame, an input drive shaft into said differential and a drive connection between said input shaft and said power unit, and a pair of main differential output drive shafts extending from said main differential and driven thereby in differential relation, a unit differential on each mower unit, each such differential having an input shaft connected to one of said main differential output shafts, and a pair of differentially driven unit differential output shafts, the latter pair of shafts of each differential on each mower unit being connected respectively in driving relation to the wheels of the mower unit on which said unit differential is mounted for driving said wheels in differential relation and ratchet drive connections between the unit differential output shafts and opposite ends of the rotary reel of the mower unit on which the unit differential is mounted.

18. The apparatus of claim 17 further characterized in that wheel means is provided on said frame member for steering said frame.

19. The apparatus of claim 17 further characterized in that said mowing units are disposed in transversely spaced relation in respect to the direction of motion and another mowing unit is pivotally attached to the frame and mounted for steering movement relative to said frame, said latter mowing unit being positioned on the frame so as to cut a swath overlapping the swaths cut by the first mentioned units.

20. A main drive differential having a power input shaft and a pair of main drive power output shafts driven in differential relation, a pair of mowing units, each having a frame, an axle mounted thereon and a pair of wheels on said axle and having a rotary reel and bed knife mounted on the frame in cooperating cutting relationship, each of said mowing units also having a unit differential mounted thereon, said unit differential having a power input shaft, and a pair of differentially driven unit drive shafts, and drive connection means between each of said unit drive shafts and one of the wheels, respectively, of said unit for rotating the wheel as the unit drive shaft rotates, and between each of the unit drive shafts and said rotary reel, said latter including a ratchet means oriented to permit the reel to overrun either of the unit drive shafts and drive connections from the output shaft of the main differential to the input shafts of the unit differentials of the mower units.

21. The apparatus of claim 20 further characterized in that the output shafts of the main differential are each provided with brakes.

References Cited in the file of this patent

UNITED STATES PATENTS

| | | |
|---|---|---|
| 1,209,519 | Townsend | Dec. 19, 1916 |
| 1,260,631 | Braun | Mar. 26, 1918 |
| 1,693,475 | Clapper | Nov. 27, 1928 |
| 1,853,244 | Townsend | Apr. 12, 1932 |
| 1,944,584 | Stegeman et al. | Jan. 23, 1934 |
| 2,145,467 | Waddell | Jan. 31, 1939 |
| 2,191,135 | Roth | Feb. 20, 1940 |
| 2,207,353 | Picha | July 9, 1940 |
| 2,298,135 | Klein | Oct. 6, 1942 |
| 2,362,262 | French | Nov. 7, 1944 |
| 2,440,794 | Bowling | May 4, 1948 |
| 2,557,066 | Armington | June 19, 1951 |